UNITED STATES PATENT OFFICE.

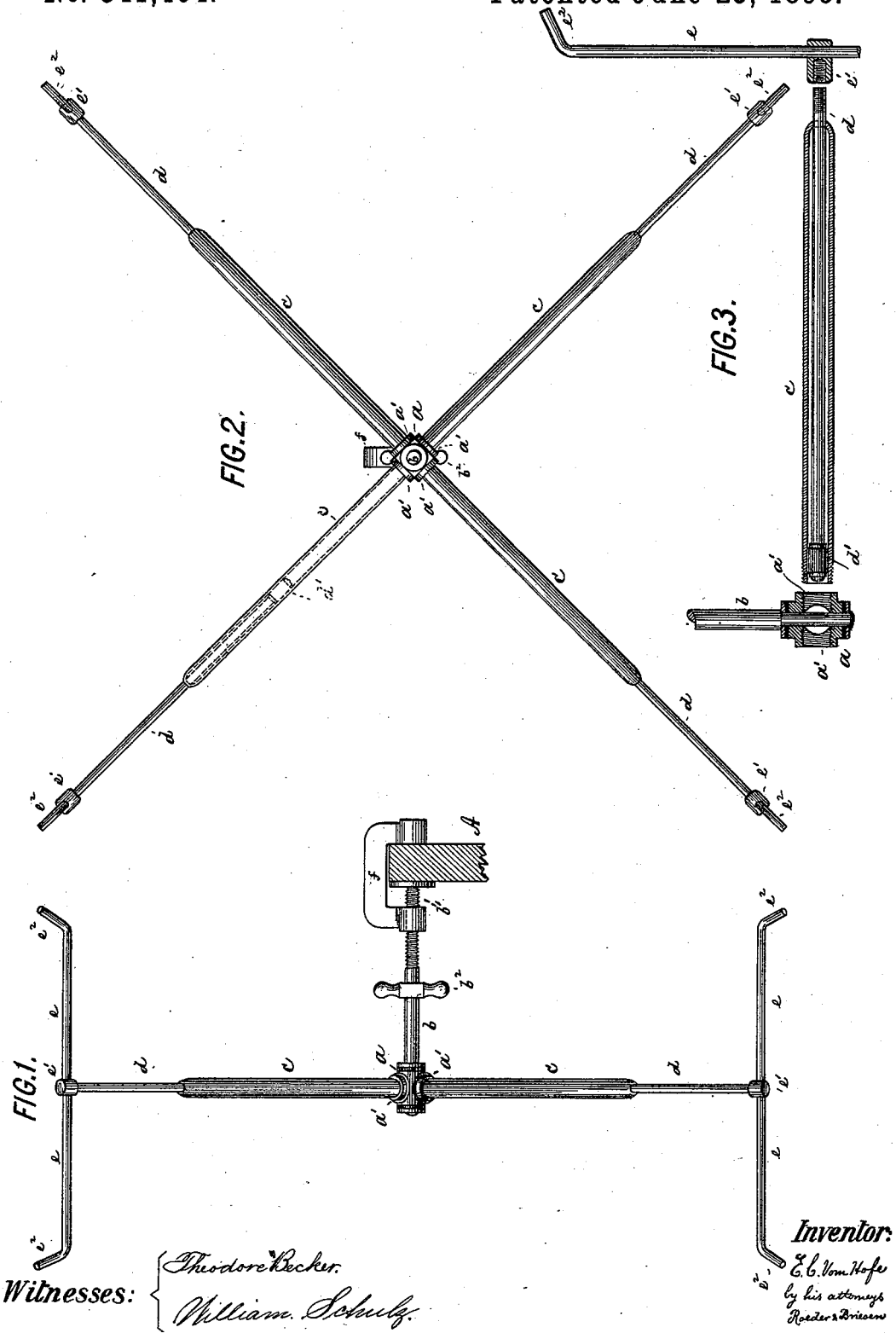

EDWARD CHARLES VOM HOFE, OF BROOKLYN, NEW YORK.

DRYING-REEL FOR FISHING-LINES.

SPECIFICATION forming part of Letters Patent No. 541,464, dated June 25, 1895.

Application filed February 27, 1894. Serial No. 501,632. (No model.)

*To all whom it may concern:*

Be it known that I, EDWARD CHARLES VOM HOFE, of Brooklyn, Kings county, New York, have invented an Improved Drying-Reel for Fishing-Lines, of which the following is a specification.

This invention relates to a drying reel for fishing lines which has extensible spokes so as to take up the slack of the drying line, and which when not in use, may be taken apart and carried about in a small pouch.

The object of my invention is to produce a drying reel which, while capable of being taken apart and packed in small compass for carriage, shall be simple in structure and economical in manufacture, and which shall contain the smallest possible number of loose or separable parts consistent with the above objects.

To this end my drying reel consists of a reel proper, mounted upon a shaft, and in order to avoid multiplicity of parts and liability to loss of the same, I have succeeded in reducing the number of parts for supporting the reel on any desired support to two, namely, the shaft on which the reel rotates, and a clamp tapped to receive the end of the shaft, which is screw-threaded.

In the accompanying drawings, Figure 1 is a side elevation of my improved reel; Fig. 2, a front view thereof; and Fig. 3, a section through the hub, spoke, and cross-bar.

The letter $a$, represents a hub, free to revolve on shaft $b$, and provided with four, more or less, threaded sockets $a'$, for the reception of the threaded tubular spokes $c$. The spokes $c$, are contracted at their outer end and telescope rods $d$, provided with the inner friction heads $d'$, so that the rods will remain in any position to which they may be drawn out.

The rods $d$, are threaded at their outer ends and engage sockets $e'$, secured to the center of cross bars $e$, having the upwardly bent ends $e^2$.

The shaft $b$, is threaded at its free end as at $b'$, and engages at right angles one jaw of a clamp $f$. Between the clamp $f$, and the hub $a$, the shaft $b$, is provided with a winged nut or thumb piece $b^2$, by which it may be revolved to enter the clamp more or less and thus constitute itself, the locking mechanism of the clamp.

When the reel is to be used, it may be attached either to a board or similar support $A$ by means of the clamp $f$. The line is wound upon the cross bars $e$, and will be held in place by the upwardly bent ends $e^2$, thereof. As the line dries and expands, either one of the rods $d$ may be drawn out of its tube, to take up the slack, and thus the line may always be kept perfectly taut.

When the reel is to be carried about, the cross bars $e$, are unscrewed, the rods $d$ are pushed into their tubes and the latter are unscrewed from the hub. Thus all the parts may be placed side by side and conveniently confined within a small pouch.

What I claim is—

A knock down drying reel composed of a threaded shaft, a hub having tapped sockets, extensible arms engaging the same, detachable cross bars having sockets engaged by the outer ends of the arms, and a clamp having a tapped jaw which is engaged by the threaded end of the shaft, substantially as specified.

EDWARD CHARLES VOM HOFE.

Witnesses:
F. V. BRIESEN,
WM. SCHULZ.